United States Patent

[11] 3,569,829

[72] Inventor Donald E. Griffey
     Skokie, Ill.
[21] Appl. No. 773,870
[22] Filed Nov. 6, 1968
[45] Patented Mar. 9, 1971
[73] Assignee Motorola, Inc.
     Franklin Park, Ill.

[54] PRECISION POWER LINE TRANSIENT GENERATOR
     3 Claims, 1 Drawing Fig.
[52] U.S. Cl. ............................................. 324/72,
     307/108, 317/151
[51] Int. Cl. ........................................... G01r 31/02

[50] Field of Search ................................. 324/72;
     307/108; 317/151; 328/28, 73

[56] References Cited
     UNITED STATES PATENTS
     2,836,787  5/1958  Seider ....................... 307/108X
     2,892,128  6/1959  Wolf ......................... 317/151X Primary Examiner—Rudolph V. Rolinec
Attorney—Mueller & Aichele ABSTRACT: An electronic-testing apparatus that can be operated to simulate and apply to a circuit under test, transient voltages similar in amplitude and duration to those induced by lightning in an electrical power distribution system having a time delayed means for transient voltage suppression.

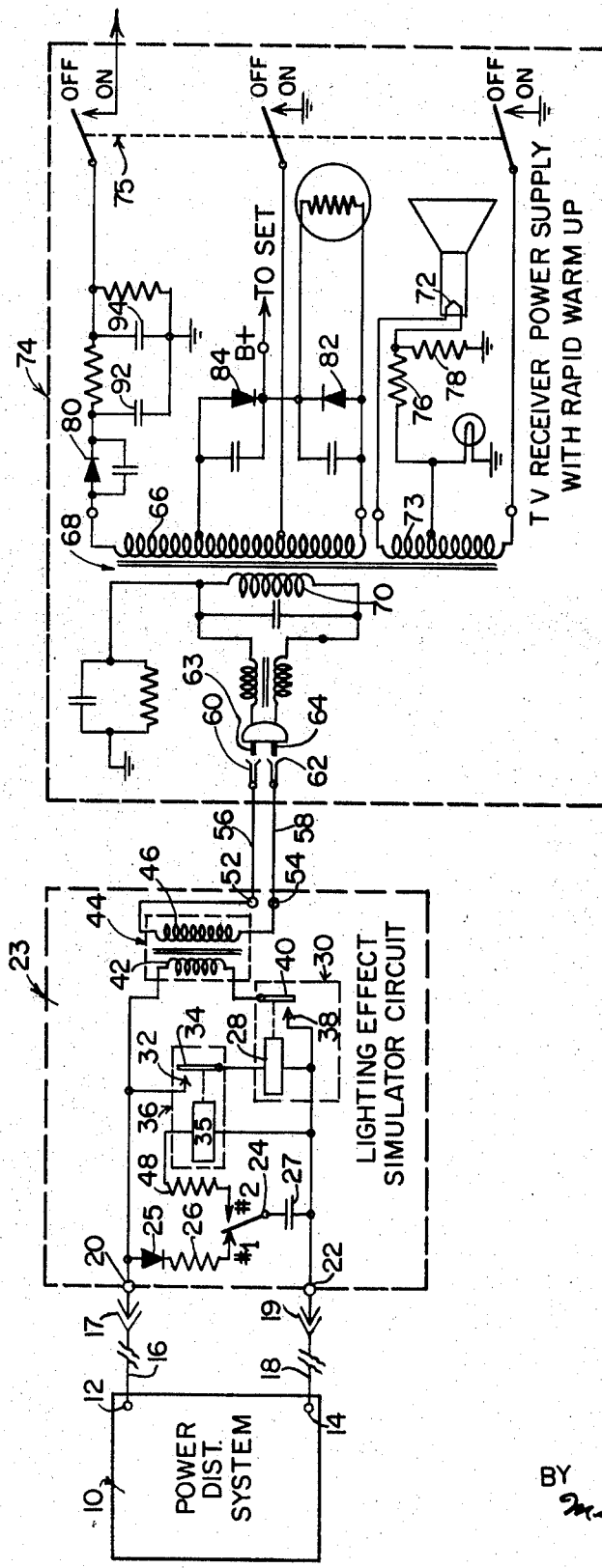

3,569,829

PRECISION POWER LINE TRANSIENT GENERATOR

BACKGROUND OF THE INVENTION

This invention relates to electronic-testing apparatus and particularly to a circuit means for simulating and applying transient voltages to an electronic device undergoing tests. The transients are similar in amplitude and duration to those induced by lightning in a power distribution system.

A "power distribution system" as used herein refers to power lines, terminals, transformer, etc. used to carry electrical power from an electrical power-generating source to various houses, industrial buildings, and other users thereof. In order to protect electrical devices conductively connected to them, most power distribution systems include a means for suppressing transient voltages induced by lightning or caused by other electrical disturbances such as extreme changes in power line loading; however, such protective means require an interval of time, on the order of 50 milliseconds, after the transient voltage has been induced or caused before they provide effective suppression thereof. During this interval of time the transient voltage is applied by the power line to all electrical equipment conductively connected thereto, thus sometimes causing damage to the equipment.

Some solid state electronic devices, such as transistorized television receivers providing "rapid warmup features" and having solid state rectifiers, are more prone to be undesirably affected by transient electrical voltages than are some of the tube-type devices. The foregoing "rapid warmup feature" utilizes circuit means to keep a small current flowing through the filament of the cathode ray picture tube and other circuitry even when the TV receiver's "on-off" switch is in the "off" position. A substantially constant coupling of the set's power supply to the power lines provides power for the rapid warmup feature and also allows any transients induced on the power line at any time to cause voltages in portions of the aforementioned circuitry resulting in adverse phenomena such as blowing fuses, destruction of silicon rectifier diodes, etc.

Likewise, other electronic devices, such as remote control equipment, also may have part of its circuitry continuously coupled to a power line thereby exposing this circuitry to possible damage by extreme transient voltages. Of course, transients can have an adverse effect on still other kinds of electronic equipment, if the transients occur while the equipment is in use and thereby electrically coupled to the power line upon which the transient occurs.

In order to improve the design and test the response of solid state electronic equipment to voltage transients caused by lightning or other electrical disturbances associated with power distribution systems, it is essential to have test equipment which can generate and apply transient voltages.

SUMMARY OF THE INVENTION

Therefore, it is an object of this invention to provide a circuit means for creating, and applying to electronic apparatus for test, transient voltages similar to those induced by lightning in and applied by electrical power distribution systems.

It is a further object of this invention to develop and apply to a circuit under test a burst of 60 cycle AC voltage, having an amplitude on the order of 1,500 volts and total time duration of about 50 milliseconds by means of a simple electronic circuit which is reliable, inexpensive, and easy to manufacture and repair.

Further objects, features and advantages will be apparent to those skilled in the art from the foregoing specification and claims with reference to the attached drawing.

DESCRIPTION OF THE DRAWING

The single FIGURE is a schematic diagram showing an embodiment of the lightning effect simulator circuit. The input of the invention is connected to a power distribution system by a power line; and the output of the invention is connected to the power input terminals of a circuit under test which, in this case, is part of the power supply circuitry of a substantially solid state television receiver having a rapid warmup feature. The TV power supply circuitry is not part of the invention but is shown to illustrate one of the many possible circuits that can be tested by this invention.

DESCRIPTION OF THE PREFERRED EMBODIMENT

Referring to the FIG., a 120 VAC power distribution system 10 has power supplying terminals 12 and 14 which are respectively connected by power lines 16 and 18, and connectors 17 and 19, to the input terminals 20 and 22 of one embodiment of the lightning effect simulator circuit 23. Connected across input terminals 20 and 22 is the series combination of activating coil 28 for second relay 30, and contacts 32 and 34 of first relay 36. Contacts 38 and 40, of second relay 30, and primary winding 42 of stepup transformer 44 are also connected in series across terminals 20 and 22.

When the single throw, double pole switch 24 is in position 01, rectifying diode 25, current limiting resistor 26, and charge-discharge capacitor 27 are connected across input terminals 20 and 22 to the power distribution system 10 which charges capacitor 27. When switch 24 is in position 02, charged capacitor 27 discharges through the series combination of resistor 48 and DC relay coil 35 to close, normally open, relay contacts 32 and 34. The interval of time during which the energy from charged capacitor 27 can energize first relay 36 is herein called the "discharge time," and it is predetermined to be about 50 milliseconds by the capacitance of capacitor 27, the DC resistance of relay coil 35, the resistance of resistor 48, and the minimum holding current of coil 35. The alternating current flow resulting from the closure of contacts 32 and 34 energizes AC relay coil 28 to close, normally open, contacts 38 and 40 of second relay 30, thereby allowing alternating current to flow through the primary winding 42 of transformer 44 thus inducing in secondary winding 46, during the discharge time, a stepped up AC voltage having a magnitude on the order of 1,500 volts. This stepped up voltage is subsequently developed across the output terminals 52 and 54, which are respectively connected by conductors 56 and 58, through connectors 60 and 62, to the power input terminals 63 and 64 of the electronic device to be tested.

After the discharge time of about 50 milliseconds the capacitor 27 has insufficient energy to keep AC relay 36 energized so relay contacts 32 and 34 open, thereby resulting in the opening of contacts 38 and 40 which deenergizes transformer 44 and removes the stepped up voltage from the power input terminals of the device under test. In summary, the Lightning Effect Simulator Circuit, operating from a 120 volt AC power source, provides a stepped up 60 cycle voltage burst of a magnitude on the order of 1,500 volts for a time duration of about 50 milliseconds to the power terminals of an electronic device to be tested.

In the embodiment shown in the FIGURE only one of many possible examples of electronic devices requiring such a test is illustrated. The circuitry 74 thus shown is a portion of the power supply circuitry for the substantially solid state Motorola 20TS TV receiver utilizing the aforementioned rapid warmup feature. After "on-off" switch 75 is in "on" position, the time it takes to heat the cathode ray tube filament 72 to operating temperatures determines the interval of time before the set will be operative. Under nontesting or normal hookup conditions input terminals 63 and 64 are connected directly to power lines which continuously provide electrical power for the CRT filament 72 through the inductive coupling between primary winding 70, and the secondary windings 66 and 73 of transformer 68. When the "on-off" switch 75 is in the "off" position, a small amount of power is supplied by the upper portion of secondary winding 73 through resistor 76 to filament 72 of the cathode ray picture tube; therefore, the filament is continuously "warmed up." Consequently when the "on-off" switch 75 is positioned to the "on" position, and a greater amount of power is provided through all of secondary winding 73 and resistor 78 to the CRT filament 72; a smaller interval of time will lapse before the filament is at full operating temperature.

As a result of the constant inductive coupling necessary for the rapid warmup feature, any change in voltage connected across input terminals 63 and 64 will be coupled into the power supply and CRT filament circuitry even though the "on-off" switch 75 is in the "off" position. If the changing voltage thus coupled is alternating in polarity, for one polarity the rectifying diodes 80 and 84 will be forward biased and rectifying diode 82 will be reversed biased, and for the other polarity diode 82 will be forward biased and diodes 80 and 82 will be reversed biased. Accordingly, a testing voltage applied to input terminal 63 and 64 tests these diodes, which have a critical peak inverse voltage rating, in their actual environment of operation. This method of testing the connected portions or parts in their actual operating environment by applying voltage transients similar to ones that the parts might be exposed to is obviously preferable to individually testing the unconnected portions or parts. The tests may be performed with "on-off" switch 75 in both the "on" and "off" positions.

Therefore, in the embodiment thus described, when switch 24 is operated, a voltage transient amplitude 1,500 volts and total duration of 50 milliseconds is applied to test the TV circuitry in its operating environment. The transient thus created and applied is similar in amplitude and in duration to transients induced in and supplied by power distribution systems having transient suppression means. The embodiment of the invention for accomplishing this useful test is simple, inexpensive, and reliable.

I claim

1. A testing circuit for applying a burst of alternating current voltage having a predetermined amplitude and time duration to an electrical device, such testing circuit including in combination:

voltage supply means providing a continuous alternating current voltage at its output of known amplitude;

rectifier means connected to the output of said voltage supply means and providing a continuous direct current output voltage in response to said continuous alternating current voltage;

switch means having a switchable member and first, second and third terminals, said switch means making connection between said first and second terminals thereof if operated to a first position, said switch means making connection between said second and third terminals thereof if operated to a second position, said first terminal being connected to said output of said rectifier means;

capacitor means connected between said second terminal of said switch means and a reference potential, said capacitor means being charged by said continuous direct current output voltage with said switch means operated to said first position thereof;

relay means with control portion having a particular resistance and normally open switchable portion;

first resistance means connecting said control portion to said third output terminal of said switch means;

transformer means having primary and secondary windings with a selected turns ratio therebetween, said primary winding being connected in series with said voltage supply means and said switchable portion of said relay means, said secondary winding being connected to the device being tested;

said first resistance means and said particular resistance of said control portion being selected such that with said switch means operated from said first position to said second position said capacitor discharges through said control portion thereby closing said normally open switchable portion for the predetermined time duration, said switchable portion thus applying said alternating current signal across said primary winding for the predetermined time duration; and said turns ratio of said transformer means being selected such that the voltage of a predetermined amplitude is applied for the predetermined time duration to the electrical device being tested.

2. The testing circuit of claim 1 wherein said relay means is comprised of: a direct current operated relay having a first control portion and first normally open contacting portions and an alternating current operated relay having a second control portion and second normally open contacting portions, said first control portion being connected in series with said capacitor and said first resistance means, said normally open first contacting portions being connected in series with said voltage supply means and said second control portion, said second contacting portions being connected in series with said voltage supply means and said primary of said transformer means, so that with said switching means operated to its said second position, said first control means is operated thereby closing said normally open first contacting portions to thereby apply said continuous alternating voltage to said second control means to thereby close said normally open second contacting portions during the predetermined period of time.

3. The testing circuit of claim 1 wherein said rectifier means is comprised of a diode connected in series with second resistance means.